United States Patent [19]

Nishioka et al.

[11] Patent Number: 4,988,651
[45] Date of Patent: * Jan. 29, 1991

[54] TEMPERATURE COMPENSATING DIELECTRIC CERAMIC COMPOSITION

[75] Inventors: Goro Nishioka, Nishinomiya; Yukio Sakabe, Kyoto; Masayuki Yamada, Takefu, all of Japan

[73] Assignee: Murata Manufacturing Co., Ltd., Japan

[*] Notice: The portion of the term of this patent subsequent to Mar. 28, 2006 has been disclaimed.

[21] Appl. No.: 428,201

[22] Filed: Oct. 27, 1989

[51] Int. Cl.$^5$ .................. C04B 35/46; C04B 35/49
[52] U.S. Cl. ................................ 501/135; 501/134
[58] Field of Search ............... 501/134, 135, 136, 137, 501/138, 104, 105; 35/46, 49

[56] References Cited

U.S. PATENT DOCUMENTS

| 4,115,493 | 9/1978 | Sakabe et al. | 501/137 |
| 4,607,314 | 8/1986 | Wada et al. | 501/136 |
| 4,767,732 | 8/1988 | Furukawa et al. | 501/134 |
| 4,801,566 | 1/1989 | Limaye et al. | 501/134 |
| 4,816,429 | 3/1989 | Nishioka et al. | 501/135 |

Primary Examiner—William R. Dixon, Jr.
Assistant Examiner—Paul Marcantoni
Attorney, Agent, or Firm—Ostrolenk, Faber, Gerb & Soffen

[57] ABSTRACT

A temperature compensating dielectric ceramic composition consists essentially of barium oxide, silicon oxide, zirconium oxide and at least one oxide selected from the group consisting of titanium oxide and tin oxide, these components, when calculated in terms of BaO, SiO$_2$, ZrO$_2$, TiO$_2$ and SnO$_2$ respectively and expressed by the general formula:

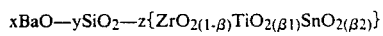

$$xBaO-ySiO_2-z\{ZrO_{2(1-\beta)}TiO_{2(\beta1)}SnO_{2(\beta2)}\}$$

(wherein x, y and z are weight percentages of respective components and $x+y+z=100$, $\beta=\beta1+\beta2$, $0\leq\beta1$, $0\leq\beta2$, and $0.01\leq\beta\leq 0.30$), having compositional proportions falling within the polygonal area defined by the points A, B, C and D in FIG. 1, the sets of x, y and z at the points A, B, C and D being as follows:

| | x | y | z |
|---|---|---|---|
| A | 50 | 49 | 1 |
| B | 50 | 20 | 30 |
| C | 15 | 20 | 65 |
| D | 15 | 84 | 1 |

In the above composition, up to 90% of barium oxide may be replaced with at least one oxide selected from the group consisting of strontium oxide and calcium oxide. Also, the above composition may contain aluminum oxide as an additive.

7 Claims, No Drawings

TEMPERATURE COMPENSATING DIELECTRIC CERAMIC COMPOSITION

BACKGROUND OF THE INVENTION

1. Field of the Invention

The present invention relates to a temperature compensating dielectric ceramic composition and, more particularly, a dielectric ceramic composition for temperature compensating monolithic ceramic capacitors.

2. Description of the Prior Art

So far, dielectric ceramic compositions of a system $MgTiO_3$-$CaTiO_3$ have been used as a dielectric material for temperature compensating monolithic ceramic capacitors.

Such monolithic ceramic capacitors are generally manufactured by a process comprising the steps of preparing ceramic green sheets, printing conductive metal paste on each green sheet to form internal electrodes, stacking the printed green sheets one on another, press-fitting the resultant stacked sheets to form a monolithic multi-layer body, and then firing the same in air at a high temperature of not less than 1300° C.

Thus, when manufacturing the monolithic ceramic capacitors with the above dielectric ceramic composition, it is required to use a metal, which does not melt at the sintering temperature of not less than 1300° C. and does not oxidize even if heated to that temperature in air, as a material for the internal electrodes. Such a requirement is fully met by noble metals with a high-melting temperature such as Pd, Pt, etc. However, these materials are quite expensive, so that the use of noble metals as a material for internal electrodes has resulted in increase of manufacturing costs of the monolithic ceramic capacitors. In addition, firing at the above high temperature results in increase of the cost of firing.

In order to solve such problems, attempts have been made to use inexpensive base metals as a material for internal electrodes. The base metals are oxidizable and reactable with the dielectric material in the oxidizing atmospheres, so that it is required to fire the dielectric material with electrodes in reducing or neutral atmospheres. However, the compositions of the system $MgTiO_3$—$CaTiO_3$ are reduced greatly in such nonoxidizing atmospheres, resulting in considerable lowering of the insulation resistance because of reduction of the oxides.

To this end, some of the inventors have proposed in U.S. Pat. No. 4,816,429 to use, as a dielectric material for temperature compensating monolithic capacitors, a dielectric ceramic composition consisting essentially of barium oxide silicon oxide and zirconium oxide, or a dielectric ceramic composition consisting essentially of barium oxide, strontium oxide, silicon oxide and zirconium oxide, said three or four components, when calculated in terms of BaO, SrO, $SiO_2$ and $ZrO_2$ respectively and expressed by the general formula:

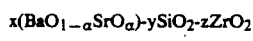

$$x(BaO_{1-\alpha}SrO_\alpha)\text{-}ySiO_2\text{-}zZrO_2$$

(wherein x, y and z are weight percentages of respective components and $x+y+z=100$, and $0 \leq \alpha \leq 0.90$), having compositional proportions falling within the polygonal area defined by the points A, B, C and D in a triangle phase diagram, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

The above composition has a low sintering temperature of not more than 1000° C. and possesses a high specific resistance of $10^{12}$ Ω-cm even if fired in nonoxidizing atmospheres. Thus, the composition makes it possible to produce monolithic ceramic capacitors with internal electrodes of a base metal.

However, it has now been found that such a dielectric composition possesses a large temperature coefficient of capacitance at the side of low temperature. For example, its temperature coefficient of capacitance at −55° C. exceeds ±100 ppm/° C. even if the composition has the temperature coefficient of capacitance at +125° C. is less than ±100 ppm/° C. In addition, the temperature coefficient of capacitance varies nonlinearly with temperature. If such a dielectric ceramic composition is applied to a temperature compensating capacitor to use it in a radio frequency (RF) tuning circuit comprising a combination of a coil and a capacitor, the output RF signal taken from the tuning circuit varies with temperature. Thus, it is difficult with the above dielectric ceramic compositions to produce temperature compensating capacitors for RF tuning circuits as they are required to have a small temperature coefficient of capacitance, linear temperature characteristics and a high Q factor.

SUMMARY OF THE INVENTION

It is therefore an object of the present invention to provide a dielectric ceramic composition for temperature compensating ceramic capacitors, which possesses a small temperature coefficient of capacitance not only at the high temperature side but at the low temperature side, as well as a high Q value of not less than 1000 and a high specific resistance of not less than $10^{12}$ Ωcm.

Another object of the present invention is to provide a dielectric ceramic composition for temperature compensating ceramic capacitors, which can be fired at a temperature of less than 1000° C. in a nonoxidizing atmosphere without causing lowering of the insulation resistance.

According to the present invention, these and other objects are solved by replacing a part of zirconium oxide in a basic composition of a system, $BaO$-$SiO_2$-$ZrO_2$, with titanium oxide and/or tin oxide.

According to the present invention, there is provided a temperature compensating dielectric ceramic composition consisting essentially of barium oxide, silicon oxide, zirconium oxide and at least one oxide selected from the group consisting of titanium oxide and tin oxide, said components, when calculated in terms of BaO, $SiO_2$, $ZrO_2$, $TiO_2$ and $SnO_2$ respectively and expressed by the general formula:

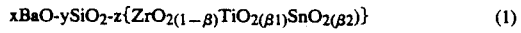

$$xBaO\text{-}ySiO_2\text{-}z\{ZrO_{2(1-\beta)}TiO_{2(\beta1)}SnO_{2(\beta2)}\} \quad (1)$$

(wherein x, y and z are weight percentage of respective components, $x+y+z=100$, $\beta = \beta1 + \beta2$, $0 \leq \beta1$, $0 \leq \beta2$, and $0.01 \leq \beta \leq 0.30$), having compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

In a preferred embodiment, up to 90 percents of barium oxide in the above composition is replaced with strontium oxide and/or calcium oxide.

Thus, according to the present invention, there is provided a temperature compensating dielectric ceramic composition consisting essentially of a barium oxide; at least one oxide selected from the group consisting of strontium oxide and calcium oxide; silicon oxide; zirconium oxide; and at least one oxide selected from the group consisting of titanium oxide and tin oxide; said components, when calculated in terms of BaO, SrO, CaO, SiO$_2$, ZrO$_2$, TiO$_2$ and SnO$_2$, respectively, and expressed by the general formula:

$$x(BaO_{(1-a)}SrO_{\alpha 1}CaO_{\alpha 2})\text{-}ySiO_2\text{-}x\{ZrO_{2(1-\beta)}TiO_{2(\beta 1)}SnO_{2(\beta 2)}\} \quad (2)$$

(where x, y and z are weight percentages of respective components, $\alpha$, $\alpha 1$, $\alpha 2$, $\beta$, $\beta 1$ and $\beta 2$ are weight fractions of the respective oxides, $x+y+z=100$, $\alpha=\alpha 1+\alpha 2$, $0\leq\alpha 1$, $0\leq\alpha 2$, $0\leq\alpha\leq 0.90$, $\beta=\beta 1+\beta 2$, $0\leq\beta 1$, $0\leq\beta 2$, and $0.01\leq\beta\leq 0.30$), having compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

In a preferred embodiment, there is provided a temperature compensating dielectric ceramic composition consisting essentially of barium oxide, strontium oxide, silicon oxide, zirconium oxide and at least one oxide selected from the group consisting of titanium oxide and tin oxide, said components, when calculated in terms of BaO, SrO, SiO$_2$, ZrO$_2$, TiO$_2$ and SnO$_2$ respectively and expressed by the general formula:

$$x(BaO_{1-\alpha}SrO_\alpha)\text{-}ySiO_2\text{-}z\{ZrO_{2(1-\beta)}TiO_{2(\beta 1)}SnO_{2(\beta 2)}\} \quad (3)$$

(wherein x, y and z are weight percentage of respective components and $x+y+z=100$, $0<\alpha\leq 0.9$, $\beta=\beta 1+\beta 2$, $0\leq\beta 1$, $0\leq\beta 2$, and $0.01\leq\beta\leq 0.30$), having compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

Further, there is provided a temperature compensating dielectric ceramic composition consisting essentially of barium oxide, calcium oxide, silicon oxide, zirconium oxide and at least one oxide selected from the group consisting of titanium oxide and tin oxide, said components, when calculated in terms of BaO, CaO, SiO$_2$, ZrO$_2$, TiO$_2$ and SnO$_2$ respectively and expressed by the general formula:

$$x(BaO_{1-\alpha}CaO_\alpha)\text{-}ySiO_2\text{-}z(ZrO_{2(1-\beta)}TiO_{2(\beta 1)}SnO_{2(\beta 2)}\} \quad (4)$$

(wherein x, y and z are weight percentages of respective components and $x+y+z=100$, $0<\alpha\leq 0.9$, $\beta=\beta 1+\beta 2$, $0\leq\beta 1$, $0\leq\beta 2$, and $0.01\leq\beta\leq 0.30$), having compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

Also, according to the present invention, there is provided a temperature compensating dielectric ceramic composition consisting essentially of barium oxide, calcium oxide, strontium oxide, silicon oxide, zirconium oxide, and at least one oxide selected from the group consisting of titanium oxide and tin oxide, said components, when calculated in terms of BaO, CaO, SrO, SiO$_2$, ZrO$_2$, TiO$_2$ and SnO$_2$ respectively and expressed by the general formula:

$$x(BaO_{(1-\alpha)}SrO_{(\alpha 1)}CaO_{(\alpha 2)}\text{-}ySiO_2\text{-}z\{ZrO_{2(1-\beta)}TiO_{2(\beta 1)}SnO_{2(\beta 2)}\} \quad (5)$$

(wherein x, y and z are weight percentages of respective components and $x+y+z=100$, $\alpha=\alpha 1+\alpha 2$, $0<\alpha 1$, $0<\alpha 2$, $0<\alpha\leq 0.90$, $\beta=\beta 1+\beta 2$, $0\leq\beta 1$, $0\leq\beta 2$, and $0.01\leq\beta\leq 0.30$), having compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  |

In another preferred embodiment, the dielectric ceramic composition of the present invention contains, as an additive, aluminum oxide in an amount of not more than 20 parts by weight in terms of Al$_2$O$_3$ per 100 parts by weight of the basic composition consisting of a dielectric ceramic composition expressed by any one of the above general formulas (1) to (5).

Thus, according to the present invention there is provided a temperature compensating dielectric ceramic composition and aluminum oxide incorporated therein, said basic composition consisting essentially of barium oxide, silicon oxide, zirconium oxide and at least one oxide selected from the group consisting of titanium oxide and tin oxide, said components, when calculated in terms of BaO, SiO$_2$, ZrO$_2$, TiO$_2$ and SnO$_2$ respectively and expressed by the general formula:

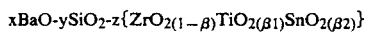

(wherein x, y and z are weight percentage of respective components and $x+y+z=100$, $\beta=\beta1+\beta2$, $0\leq\beta1$, $0\leq\beta2$, and $0.01\leq\beta\leq0.30$), having compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  | the content of said aluminum oxide being, when calculated in terms of Al$_2$O$_3$, not more than 20 parts by weight per 100 parts by weight of said basic composition.

According to the present invention, there is also provided a temperature compensating dielectric ceramic composition consisting essentially of a basic composition and aluminum oxide incorporated therein, said basic composition consisting essentially of barium oxide, at least one oxide selected from the group consisting of strontium oxide and calcium oxide, silicon oxide, zirconium oxide and at least one oxide selected from the group consisting of titanium oxide and tin oxide, said components, when calculated in terms of BaO, SrO, CaO, SiO$_2$, ZrO$_2$, TiO$_2$ and SnO$_2$ respectively and expressed by the general formula:

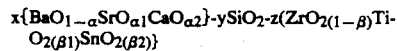

(wherein x, y and z are weight percentage of respective components and $x+y+z=100$, $\alpha=\alpha1+\alpha2$, $0\leq\alpha1$, $0\leq\alpha2$, $0\leq\alpha\leq0.90$, $\beta=\beta1+\beta2$, $0\leq\beta1$, $0\leq\beta2$, and $0.01\leq\beta\leq0.30$), having compositional proportions falling within the polygonal area defined by the points A, B, C and D in FIG. 1, the sets of x, y and z at said points A, B, C and D being as follows:

|   | x  | y  | z  |
|---|----|----|----|
| A | 50 | 49 | 1  |
| B | 50 | 20 | 30 |
| C | 15 | 20 | 65 |
| D | 15 | 84 | 1  | the content of said aluminum oxide being, when calculated in terms of Al$_2$O$_3$, not more than 20 parts by weight per 100 parts by weight of said basic composition.

The dielectric ceramic composition of the present invention possesses a high specific resistance of not less than $10^{12}$ Ωcm, a high Q value of not less than 1000 and a small temperature coefficient of capacitance of not more than ±100 ppm/°C. even at low temperatures, thus making it possible to produce temperature compensating ceramic capacitors with excellent temperature characteristics.

Further, the dielectric ceramic composition of the present invention is sintered at a temperature of not more than 1000° C. in a reducing or neutral atmosphere composed of a nonoxidizing gas such as N$_2$, Ar, CO$_2$, CO, H$_2$ and mixtures thereof, without causing lowering of insulating resistance. Thus, the dielectric ceramic composition of the present invention, when used as a dielectric for monolithic ceramic capacitors, makes it possible to reduce the firing cost as well as to use non-precious metals with low specific resistance such as copper, copper alloys and other base metals as a material for internal electrodes of the monolithic ceramic capacitors. Accordingly, the present invention makes it possible to achieve considerable reduction of the manufacturing cost of the monolithic ceramic capacitors.

The reasons why the dielectric ceramic composition of the present invention has been limited to those having a set of x, y and z falling within the polygonal area defined by the points A, B, C and D in FIG. 1 are as follows. If the composition is the one having a set of x, y and z falling in the area outside of the side AB of a quadrangle ABCD in FIG. 1, the Q value becomes less than 1000 and the temperature coefficient of capacitance becomes more than +100 ppm/°C. Also, there is formation of a glassy material on sintered ceramic bodies.

If the composition is the one having a set of x, y and z falling in the area outside of the side AD of the quadrangle ABCD in FIG. 1, the Q value becomes less than 1000 and the temperature coefficient of capacitance becomes more than +100 ppm/°C. Also, there is formation of a glassy material on sintered ceramic bodies.

If the composition is the one having a set of x, y and z falling in the area outside of the side BC of the quadrangle ABCD in FIG. 1, it is impossible to produce dense sintered ceramic bodies even if fired at a temperature of 1150° C.

If the composition is the one having a set of x, y and z falling in the area outside of the side CD of the quadrangle ABCD, it is impossible to produce dense sintered ceramic bodies even if fired at a temperature of 1150° C. If the composition contains no barium oxide, i.e., $\alpha=1$, it is impossible to produce dense sintered ceramic bodies even if fired at a temperature of 1150° C.

Titanium oxide and/or tin oxide is replaced for a part of zirconium oxide in the system BaO—SiO$_2$—ZrO$_2$ to improve the temperature characteristics of capacitance. By replacing at least 1 % by weight of zirconium oxide with titanium oxide and/or tin oxide, the temperature coefficient of capacitance at high temperature and that at low temperatures become small and less than 100 ppm/°C. However, if the amount of substitution of titanium oxide and/or tin oxide oxide exceeds 30% by weight of zirconium oxide, the sintering properties become worse and the sintering temperature exceeds 1150° C.

In order to improve the sintering properties of the composition, it is preferred to replace a part of barium oxide with strontium oxide and/or calcium oxide. However, if more than 90 percent of barium oxide is replaced with strontium oxide and/or calcium oxide, it becomes difficult to produce dense dielectric ceramic bodies.

The addition of Al$_2$O$_3$ to the above basic composition contributes to minimize variation of the ceramic characteristics due to change in composition, thus making it possible to produce ceramic bodies with uniform characteristics. However, if the added amount of Al$_2$O$_3$ exceeds 20 parts by weight per 100 parts by weight of the above basic composition, the sintering temperature becomes higher than 1000° C.

The above and other objects, features and advantages of the present invention will be further apparent from the following description with reference to the examples.

BRIEF DESCRIPTION OF THE DRAWINGS

FIG. 1 is a triangular diagram of a system {BaO$_{(1-\alpha)}$SrO$_{(\alpha 1)}$CaO$_{(\alpha 2)}$}-SiO$_2$-{ZrO$_{2(1-\beta)}$TiO$_{2(\beta 1)}$ZrO$_{2(\beta 2)}$} showing a compositional area of the temperature compensating dielectric ceramic composition of the present invention. The numbers on the drawings correspond to the respective specimen numbers listed in Tables 1 to 8.

EXAMPLES

Using BaCO$_3$, CaCO$_3$, SrCO$_3$, SiO$_2$, ZrO$_2$, TiO$_2$, SnO$_2$ and Al$_2$O$_3$ as raw materials, there were prepared specimens of dielectric ceramics in the following manner: The raw materials were weighed to prepare a mixture so that the resultant sintered body has a composition shown in Tables 1, 3, 5 and 7, mixed by the wet process in a ball mill for 16 hours, and then dried by vaporization to prepare mixed powder of raw materials. In Tables 1, 3, 5, and 7, the amounts of substitution of the each oxide are given by weight percentages.

The mixed powder was calcined at 850° C. for 2 hours, milled by the wet process for 16 hours together with 5 parts by weight of vinyl acetate, dried by evaporation and passed through a sieve to prepare granulated powder. The resultant granulated powder was compacted into green ceramic disks with a diameter of 22 mm and a thickness of 1.0 mm under a pressure of 2000 Kg/cm$^2$. The green compacts were fired at temperatures shown in Tables 2, 4, 6 and 8 for 2 hours in a N$_2$—H$_2$ gas atmosphere.

Each resultant ceramic disk was provided with electrodes on its opposite sides. As a material for electrodes, there was employed In-Ga alloy paste to prevent the ceramic disks from variations of characteristics during formation of electrodes.

For each specimen, the measurements were made on a sintering temperature, dielectric constant ($\epsilon$), Q, temperature coefficient (TC) of capacitance and specific resistance under the following conditions. Results are shown in Tables 2, 4, 6 and 8.

The dielectric constant and Q were measured at 1 MHz, 25° C. with an impedance analyzer, Model 4192, made by Yokogawa Hewlett Packard CO.

The temperature coefficient of capacitance at low temperatures was determined from values of capacitance at 25° C. and −55° C. by the equation:

$$\{(C_{-55}-C_{25})/C_{25}(-55-25)\} \times 10^6 \text{ (ppm/°C.)}$$

where $C_{-55}$ is a capacitance measured at −55° C. and $C_{25}$ is a capacitance measured at 25° C.

The temperature coefficient of capacitance at high temperatures was determined from values of capacitance at 25° C. and 125° C. by the equation:

$$\{(C_{125}-C_{25})/C_{25}(125-25)\} \times 10^6 \text{ (ppm/°C.)}$$

where $C_{125}$ is a capacitance measured at 125° C. and $C_{25}$ is a capacitance measured at 25° C.

The specific resistance was determined from a current measured under application of DC voltage of 500 v at 25° C.

In Tables 1 to 8, specimens with an asterisk (*) are those having a composition beyond the scope of the present invention, while other specimens are those having a composition included in the scope of the present invention.

TABLE 1

| No. | Basic Composition (weight %) | | | Replaced Amount (wt %) | | Additive (parts by wt) |
|---|---|---|---|---|---|---|
| | BaO | SiO$_2$ | ZrO$_2$ | TiO$_2$ $\beta$1 | SnO$_2$ $\beta$2 | Al$_2$O$_3$ |
| 1 | 50 | 49 | 1 | 10 | 0 | 0 |
| 2 | 50 | 20 | 30 | 5 | 5 | 0 |
| 3 | 15 | 20 | 65 | 0 | 10 | 0 |
| 4 | 15 | 84 | 1 | 20 | 0 | 0 |
| 5* | 45 | 55 | 0 | 5 | 0 | 0 |
| 6* | 55 | 40 | 5 | 5 | 0 | 0 |
| 7* | 25 | 10 | 65 | 5 | 0 | 0 |
| 8* | 10 | 60 | 30 | 5 | 0 | 0 |
| 9 | 30 | 40 | 30 | 0 | 5 | 5 |
| 10 | 30 | 40 | 30 | 10 | 0 | 20 |
| 11* | 30 | 40 | 30 | 5 | 0 | 25 |
| 12 | 40 | 45 | 15 | 1 | 0 | 5 |
| 13 | 25 | 60 | 15 | 10 | 0 | 5 |
| 14* | 30 | 40 | 30 | 0 | 0 | 5 |
| 15* | 30 | 40 | 30 | 35 | 0 | 0 |
| 16 | 40 | 45 | 15 | 30 | 0 | 5 |

TABLE 2

| No. | Sintering temp. (°C.) | $\epsilon_r$ | Q | TC of Capacitance (ppm/°C.) | | $\rho$ ($\Omega$cm) |
|---|---|---|---|---|---|---|
| | | | | At −55° C. | At +125° C. | |
| 1. | 970 | 9 | 1610 | +80 | +70 | 2 × 10$^{12}$ |
| 2 | 980 | 10 | 1720 | +30 | +20 | 3 × 10$^{12}$ |
| 3 | 950 | 9 | 1840 | ±0 | −30 | 2 × 10$^{12}$ |
| 4 | 980 | 8 | 1640 | +50 | +90 | 4 × 10$^{12}$ |
| 5* | 900 | 9 | 540 | +90 | +150 | 2 × 10$^{12}$ |
| 6* | 900 | 9 | 700 | +80 | +130 | 5 × 10$^{12}$ |
| 7* | | | not sintered at 1150° C. | | | |
| 8* | | | not sintered at 1150° C. | | | |
| 9 | 1000 | 9 | 1720 | +70 | +50 | 3 × 10$^{12}$ |
| 10 | 980 | 9 | 1580 | +30 | +30 | 4 × 10$^{12}$ |
| 11* | | | not sintered at 1150° C. | | | |
| 12 | 950 | 8 | 1820 | +40 | +20 | 2 × 10$^{12}$ |
| 13 | 950 | 9 | 1950 | +50 | +70 | 3 × 10$^{12}$ |
| 14* | 970 | 8 | 1710 | +110 | +10 | 4 × 10$^{12}$ |
| 15* | | | not sintered at 1150° C. | | | |
| 16 | 980 | 9 | 2100 | −30 | +10 | 5 × 10$^{12}$ |

TABLE 3

| No. | Basic Composition (weight %) | | | | | | Replaced Amount (wt %) | | Additive (parts by wt) |
|---|---|---|---|---|---|---|---|---|---|
| | (Ba$_{1-\alpha}$Sr$_\alpha$)O | $\alpha$ | BaO | SrO | SiO$_2$ | ZrO$_2$ | TiO$_2$ $\beta$1 | SnO$_2$ $\beta$2 | Al$_2$O$_3$ |
| 17 | 50 | 0.5 | 25 | 25 | 49 | 1 | 10 | 0 | 0 |
| 18 | 50 | 0.3 | 35 | 15 | 20 | 30 | 5 | 5 | 1 |
| 19 | 15 | 0.7 | 4.5 | 10.5 | 20 | 65 | 0 | 10 | 5 |
| 20 | 15 | 0.8 | 3 | 12 | 84 | 1 | 20 | 0 | 2 |
| 21* | 45 | 0.4 | 27 | 18 | 55 | 0 | 5 | 0 | 4 |
| 22* | 55 | 0.7 | 16.5 | 38.5 | 40 | 5 | 5 | 0 | 10 |
| 23* | 25 | 0.3 | 17.5 | 7.5 | 10 | 65 | 5 | 0 | 15 |
| 24* | 10 | 0.2 | 8 | 2 | 60 | 30 | 5 | 0 | 15 |

TABLE 3-continued

| No. | Basic Composition (weight %) $(Ba_{1-\alpha}Sr_\alpha)O$ | $\alpha$ | BaO | SrO | $SiO_2$ | $ZrO_2$ | Replaced Amount (wt %) $TiO_2$ $\beta1$ | $SnO_2$ $\beta2$ | Additive (parts by wt) $Al_2O_3$ |
|---|---|---|---|---|---|---|---|---|---|
| 25 | 30 | 0.9 | 3 | 27 | 40 | 30 | 0 | 5 | 0 |
| 26 | 30 | 0.4 | 18 | 12 | 40 | 30 | 10 | 0 | 20 |
| 27* | 30 | 0.5 | 15 | 15 | 40 | 30 | 5 | 0 | 25 |
| 28 | 40 | 0.5 | 20 | 20 | 45 | 15 | 1 | 0 | 5 |
| 29 | 25 | 0.5 | 12.5 | 12.5 | 60 | 15 | 10 | 0 | 5 |
| 30* | 25 | 1.0 | 0 | 25 | 60 | 15 | 5 | 0 | 10 |
| 31* | 30 | 0.4 | 18 | 12 | 40 | 30 | 0 | 0 | 5 |
| 32* | 30 | 0.9 | 3 | 27 | 40 | 30 | 35 | 0 | 0 |
| 33 | 40 | 0.5 | 20 | 20 | 45 | 15 | 30 | 0 | 5 |

TABLE 4

| No. | Sintering temp. (°C.) | $\epsilon r$ | Q | TC of Capacitance (ppm/°C.) At −55° C. | At +125° C. | $\rho$ ($\Omega$cm) |
|---|---|---|---|---|---|---|
| 17 | 950 | 10 | 1640 | +40 | +60 | $2 \times 10^{12}$ |
| 18 | 950 | 10 | 1730 | +30 | +40 | $3 \times 10^{12}$ |
| 19 | 980 | 11 | 1840 | −40 | −30 | $2 \times 10^{12}$ |
| 20 | 980 | 10 | 1750 | +10 | +50 | $4 \times 10^{12}$ |
| 21* | 900 | 7 | 520 | +120 | +150 | $3 \times 10^{12}$ |
| 22* | 900 | 8 | 560 | +130 | +170 | $2 \times 10^{12}$ |
| 23* | not sintered at 1150° C. | | | | | |
| 24* | not sintered at 1150° C. | | | | | |
| 25 | 980 | 10 | 1930 | +30 | +50 | $3 \times 10^{12}$ |
| 26 | 970 | 10 | 1780 | +20 | +70 | $2 \times 10^{12}$ |
| 27* | not sintered at 1150° C. | | | | | |
| 28 | 920 | 8 | 2150 | +40 | +10 | $3 \times 10^{12}$ |
| 29 | 910 | 8 | 2260 | ±0 | +50 | $3 \times 10^{12}$ |
| 30* | not sintered at 1150° C. | | | | | |
| 31* | 950 | 10 | 1650 | +120 | +60 | $3 \times 10^{12}$ |
| 32* | not sintered at 1150° C. | | | | | |
| 33 | 1000 | 10 | 2310 | ±0 | +30 | $4 \times 10^{12}$ |

TABLE 6

| No. | Sintering temp. (°C.) | $\epsilon r$ | Q | TC of Capacitance (ppm/°C.) At −55° C. | At +125° C. | $\rho$ ($\Omega$cm) |
|---|---|---|---|---|---|---|
| 34 | 970 | 9 | 1530 | +50 | +80 | $2 \times 10^{12}$ |
| 35 | 970 | 10 | 1680 | +10 | +40 | $2 \times 10^{12}$ |
| 36 | 950 | 9 | 1720 | ±0 | −30 | $3 \times 10^{12}$ |
| 37 | 950 | 8 | 1580 | +30 | +80 | $2 \times 10^{12}$ |
| 38* | 900 | 7 | 430 | +120 | +170 | $3 \times 10^{12}$ |
| 39* | 900 | 8 | 710 | +150 | +220 | $4 \times 10^{12}$ |
| 40* | not sintered at 1150° C. | | | | | |
| 41* | not sintered at 1150° C. | | | | | |
| 42 | 970 | 9 | 1840 | +10 | +50 | $2 \times 10^{12}$ |
| 43 | 950 | 10 | 1450 | +30 | +70 | $3 \times 10^{12}$ |
| 44* | not sintered at 1150° C. | | | | | |
| 45 | 970 | 8 | 1820 | +10 | +40 | $4 \times 10^{12}$ |
| 46 | 950 | 9 | 2140 | +30 | +60 | $3 \times 10^{12}$ |
| 47* | not sintered at 1150° C. | | | | | |
| 48* | 970 | 9 | 1380 | +150 | +90 | $4 \times 10^{12}$ |
| 49* | not sintered at 1150° C. | | | | | |
| 50 | 1000 | 10 | 2150 | −10 | +30 | $4 \times 10^{12}$ |

TABLE 5

| No. | Basic Composition (weight %) $(Ba_{1-\alpha}Ca_\alpha)O$ | $\alpha$ | BaO | CaO | $SiO_2$ | $ZrO_2$ | Replaced Amount (wt %) $TiO_2$ $\beta1$ | $SnO_2$ $\beta2$ | Additive (parts by wt) $Al_2O_3$ |
|---|---|---|---|---|---|---|---|---|---|
| 34 | 50 | 0.5 | 25 | 25 | 49 | 1 | 10 | 0 | 0 |
| 35 | 50 | 0.3 | 35 | 15 | 20 | 30 | 5 | 5 | 1 |
| 36 | 15 | 0.7 | 4.5 | 10.5 | 20 | 65 | 0 | 10 | 5 |
| 37 | 15 | 0.8 | 3 | 12 | 84 | 1 | 20 | 0 | 2 |
| 38* | 45 | 0.4 | 27 | 18 | 55 | 0 | 5 | 0 | 4 |
| 39* | 55 | 0.7 | 16.5 | 38.5 | 40 | 5 | 5 | 0 | 10 |
| 40* | 25 | 0.3 | 17.5 | 7.5 | 10 | 65 | 5 | 0 | 15 |
| 41* | 10 | 0.2 | 8 | 2 | 60 | 30 | 5 | 0 | 15 |
| 42 | 30 | 0.9 | 3 | 27 | 40 | 30 | 0 | 5 | 0 |
| 43 | 30 | 0.4 | 18 | 12 | 40 | 30 | 10 | 0 | 20 |
| 44* | 30 | 0.5 | 15 | 15 | 40 | 30 | 5 | 0 | 25 |
| 45 | 40 | 0.5 | 20 | 20 | 45 | 15 | 1 | 0 | 5 |
| 46 | 25 | 0.5 | 12.5 | 12.5 | 60 | 15 | 10 | 0 | 5 |
| 47* | 25 | 1.0 | 0 | 25 | 60 | 15 | 5 | 0 | 10 |
| 48* | 30 | 0.4 | 18 | 12 | 40 | 30 | 0 | 0 | 5 |
| 49* | 30 | 0.9 | 3 | 27 | 40 | 30 | 35 | 0 | 0 |
| 50 | 40 | 0.5 | 20 | 20 | 45 | 15 | 30 | 0 | 5 |

TABLE 7

| No. | Basic Composition (weight %) $(Ba_{1-\alpha1-\alpha2}Ca_{\alpha1}Sr_{\alpha2})O$ | $\alpha1$ | $\alpha2$ | BaO | CaO | SrO | $SiO_2$ | $ZrO_2$ | Replaced Amount (wt %) $TiO_2$ $\beta1$ | $SnO_2$ $\beta2$ | Additive (parts by wt) $Al_2O_3$ |
|---|---|---|---|---|---|---|---|---|---|---|---|
| 51 | 50 | 0.3 | 0.3 | 20 | 15 | 15 | 49 | 1 | 10 | 0 | 0 |
| 52 | 50 | 0.2 | 0.2 | 30 | 10 | 10 | 20 | 30 | 5 | 5 | 1 |
| 53 | 15 | 0.6 | 0.2 | 3 | 9 | 3 | 20 | 65 | 0 | 10 | 5 |
| 54 | 15 | 0.2 | 0.6 | 3 | 3 | 9 | 84 | 1 | 20 | 0 | 2 |
| 55* | 45 | 0.2 | 0.2 | 27 | 9 | 9 | 55 | 0 | 5 | 0 | 4 |
| 56* | 55 | 0.4 | 0.4 | 11 | 22 | 22 | 40 | 5 | 5 | 0 | 10 |
| 57* | 25 | 0.2 | 0.2 | 15 | 5 | 5 | 10 | 65 | 5 | 0 | 15 |
| 58* | 10 | 0.1 | 0.1 | 8 | 1 | 1 | 60 | 30 | 5 | 0 | 15 |
| 59 | 30 | 0.4 | 0.5 | 3 | 12 | 15 | 40 | 30 | 0 | 5 | 0 |
| 60 | 30 | 0.1 | 0.3 | 18 | 3 | 9 | 40 | 30 | 10 | 0 | 20 |
| 61* | 30 | 0.2 | 0.3 | 15 | 6 | 9 | 40 | 30 | 5 | 0 | 25 |

TABLE 7-continued

| No. | Basic Composition (weight %) | | | | | | | | | Replaced Amount (wt %) | | Additive (parts by wt) |
| | $(Ba_{1-\alpha1-\alpha2}Ca_{\alpha1}Sr_{\alpha2})O$ | $\alpha1$ | $\alpha2$ | BaO | CaO | SrO | $SiO_2$ | $ZrO_2$ | $TiO_2$ $\beta1$ | $SnO_2$ $\beta2$ | $Al_2O_3$ |
|---|---|---|---|---|---|---|---|---|---|---|---|
| 62 | 40 | 0.2 | 0.3 | 20 | 8 | 12 | 45 | 15 | 1 | 0 | 5 |
| 63 | 25 | 0.2 | 0.3 | 12.5 | 5 | 7.5 | 60 | 15 | 10 | 0 | 5 |
| 64* | 25 | 0.5 | 0.5 | 0 | 12.5 | 12.5 | 60 | 15 | 5 | 0 | 10 |
| 65* | 25 | 1.0 | 0 | 0 | 25 | 0 | 60 | 15 | 5 | 0 | 5 |
| 66* | 30 | 0.2 | 0.2 | 18 | 6 | 6 | 40 | 30 | 0 | 0 | 5 |
| 67* | 30 | 0.5 | 0.4 | 3 | 15 | 12 | 40 | 30 | 35 | 0 | 0 |
| 68 | 40 | 0.2 | 0.3 | 20 | 8 | 12 | 45 | 15 | 30 | 0 | 5 |

TABLE 8

| No. | Sintering temp. (°C.) | $\epsilon r$ | Q | TC of Capacitance (ppm/°C.) | | $\rho$ ($\Omega cm$) |
| | | | | At −55° C. | At +125° C. | |
|---|---|---|---|---|---|---|
| 51 | 970 | 10 | 1600 | +60 | +40 | $2 \times 10^{12}$ |
| 52 | 970 | 10 | 1730 | +30 | +20 | $2 \times 10^{12}$ |
| 53 | 980 | 9 | 1650 | ±0 | −30 | $3 \times 10^{12}$ |
| 54 | 950 | 9 | 1800 | +90 | +90 | $3 \times 10^{12}$ |
| 55* | 920 | 8 | 240 | +120 | +120 | $4 \times 10^{12}$ |
| 56* | 930 | 7 | 350 | +120 | +150 | $3 \times 10^{12}$ |
| 57* | | | not sintered at 1150° C. | | | |
| 58* | | | not sintered at 1150° C. | | | |
| 59 | 950 | 8 | 2120 | +60 | +50 | $4 \times 10^{12}$ |
| 60 | 980 | 11 | 1510 | +40 | +30 | $1 \times 10^{12}$ |
| 61* | | | not sintered at 1150° C. | | | |
| 62 | 950 | 8 | 1780 | +50 | +40 | $4 \times 10^{12}$ |
| 63 | 970 | 10 | 2130 | ±0 | +20 | $5 \times 10^{12}$ |
| 64* | | | not sintered at 1150° C. | | | |
| 65* | | | not sintered at 1150° C. | | | |
| 66* | 970 | 9 | 1820 | +150 | +30 | $3 \times 10^{12}$ |
| 67* | | | not sintered at 1150° C. | | | |
| 68 | 1000 | 10 | 1750 | −30 | ±0 | $3 \times 10^{12}$ |

As will be understood from the data shown in Tables 1 to 8, the temperature compensating dielectric ceramic composition of the present invention is improved in the temperature characteristics of capacitance by replacing a part of zirconium oxide with titanium oxide and/or tin oxide. Also, it has a sintering temperature of not more than 1000° C., a high Q value of not less than 1000, and a high specific resistance of not less than $10^{12}$ $\Omega$cm. Further, the replacement of a part of BaO with SrO and/or makes it possible to lower the sintering temperature of the composition.

COMPARATIVE EXAMPLES

Using the same raw materials, $BaCO_3$, $SrCO_3$, $SiO_2$, $ZrO_2$ and $Al_2O_3$, as those in examples, comparative specimens of dielectric ceramics were prepared in the same manner as disclosed in U.S. Pat. No. 4,816,429. The raw materials were weighed to prepare a mixture so that the resultant sintered body has a composition shown in Table 9. The resultant mixture was milled by the wet process in a ball mill for 16 hours, and then dried by vaporization.

TABLE 9

| Specimen No. | $x(BaO_{1-a} SrO_a)$-$ySiO_2$-$zZrO_2$ + $nAl_2O_3$ | | | | | |
| | x | a | BaO | SrO | $SiO_2$ | $ZrO_2$ | n |
|---|---|---|---|---|---|---|---|
| 101 | 50 | 0 | 50 | 0 | 49 | 1 | 0 |
| 102 | 15 | 0 | 15 | 0 | 20 | 65 | 0 |
| 103 | 15 | 0.7 | 4.5 | 10.5 | 20 | 65 | 5 |

The mixture was calcined at 850° C. for 2 hours, milled by the wet process for 16 hours together with 5 parts by weight of vinyl alcohol, dried by evaporation and passed through an 80 mesh sieve to prepare granulated powder. The resultant granulated powder was compacted into green ceramic disks with a diameter of 22 mm and a thickness of 1.0 mm under a pressure of 2000 Kg/cm². The green compacts were fired at temperatures shown in Table 10 for 2 hours in nitrogen gas atmosphere. Each resultant ceramic disk was provided with In-Ga alloy electrodes on its opposite sides, using In-Ga alloy paste and subjected measurements of electrical properties. Results are shown in Table 10.

TABLE 10

| No. | Sintering temp (°C.) | $\epsilon$ | Q | TC of Capacitance (ppm/°C.) | | R ($\Omega$-cm) |
| | | | | −55° C. | +125° C. | |
|---|---|---|---|---|---|---|
| 101 | 950 | 8 | 1540 | +110 | +90 | $2 \times 10^{12}$ |
| 102 | 1000 | 10 | 1630 | +90 | −70 | $4 \times 10^{12}$ |
| 103 | 970 | 10 | 1580 | +90 | −40 | $3 \times 10^{12}$ |
| 1 | 970 | 9 | 1610 | +80 | +70 | $2 \times 10^{12}$ |
| 3 | 950 | 9 | 1840 | ±0 | −30 | $2 \times 10^{12}$ |
| 19 | 980 | 11 | 1840 | −40 | −30 | $2 \times 10^{12}$ |
| 36 | 950 | 9 | 1720 | ±0 | −30 | $3 \times 10^{12}$ |
| 53 | 980 | 9 | 1650 | ±0 | −30 | $3 \times 10^{12}$ |

In Table 10, data for specimens Nos. 1, 3, 19, 36 and 53 according to the present invention are also listed for comparison.

From the comparison between the data for the specimens Nos. 1, 3, 19, 36 and 53 and those for the comparative specimens, it will be seen that the composition of the present invention is improved in the temperature characteristics as it possesses a temperature coefficient of capacitance of less than ±100 ppm/° C., and as the temperature coefficient of capacitance at −55° C. takes a value with the same negative or positive sign as that for the value at +125° C. This means that the composition of the present invention has better linearity.

What I claim is:

1. A temperature compensating dielectric ceramic composition consisting essentially of a solid solution composed of barium oxide, silicon oxide, zirconium oxide, and at least one oxide selected from the group consisting of titanium oxide and tin oxide, said components, when calculated in terms of BaO, $SiO_2$, $ZrO_2$ $TiO_2$ and $SnO_2$ respectively and expressed by the formula:

$$xBaO\text{-}ySiO_2\text{-}z\{ZrO_{2(1-\beta)}TiO_{2(\beta1)}SnO_{2(\beta2)}\}$$

(wherein x, y and z are weight percentages of respective components, $x+y+z=100$, $\beta=\beta1+\beta2$, $0 \leq \beta_1$, $0 \leq \beta_2$, $0.01 \leq \beta \leq 0.30$), having compositional proportions falling within the polygonal area defined by the points A, B, C and D in FIG. 1, the sets of x, y and z at said points A, B, C and D being as follows:

| | x | y | z |
|---|---|---|---|
| A | 50 | 49 | 1 |

| | x | y | z |
|---|---|---|---|
| B | 50 | 20 | 30 |
| C | 15 | 20 | 65 |
| D | 15 | 84 | 1 |

2. A temperature compensating dielectric ceramic composition consisting essentially of barium oxide, strontium oxide, calcium oxide, silicon oxide, zirconium oxide and at least one oxide selected from the group consisting of titanium oxide and tin oxide, said components, when calculated in terms of BaO, SrO, CaO, SiO$_2$, ZrO$_2$, TiO$_2$ and SnO$_2$ respectively and expressed by the general formula:

$$x\{BaO_{1-\alpha}SrO_{\alpha 1}CaO_{\alpha 2}\}\text{-}ySiO_2\text{-}z\{ZrO_{2(1-\beta)}TiO_{2(\beta 1)}SnO_{2(\beta 2)}\}$$

(wherein x, y and z are weight percentage of respective components and $x+y+z=100$, $\alpha=\alpha 1+\alpha 2$, $0\leq\alpha 1$, $0\leq\alpha 2$, $0<\alpha\leq 0.90$, $\beta=\beta 1+\beta 2$, $0\leq\beta 1$, $0\leq\beta 2$, and $0.01\leq\beta\leq 0.30$), having compositional proportions falling within the polygonal area defined by the points A, B, C and D in FIG. 1, the sets of x, y and z at said points A, B, C and D being as follows:

| | x | y | z |
|---|---|---|---|
| A | 50 | 49 | 1 |
| B | 50 | 20 | 30 |
| C | 15 | 20 | 65 |
| D | 15 | 84 | 1 |

3. A temperature compensating dielectric ceramic composition claimed in claim 2 wherein said composition consists essentially of barium oxide, strontium oxide, silicon oxide, zirconium oxide and at least one oxide selected from the group consisting of titanium oxide and tin oxide.

4. A temperature compensating dielectric ceramic composition claimed in claim 2 wherein said composition consists essentially of barium oxide, calcium oxide, silicon oxide, zirconium oxide and at least one oxide selected from the group consisting of titanium oxide and tin oxide.

5. A temperature compensating dielectric ceramic composition claimed in claim 2 wherein said composition consists essentially of barium oxide, strontium oxide, calcium oxide, silicon oxide, zirconium oxide and at least one oxide selected from the group consisting of titanium oxide and tin oxide.

6. A temperature compensating dielectric ceramic composition consisting essentially of a basic composition and aluminum oxide incorporated therein, said basic composition consisting essentially of barium oxide, silicon oxide, zirconium oxide and at least one oxide selected from the group consisting of titanium oxide and tin oxide, said components, when calculated in terms of BaO, SiO$_2$, ZrO$_2$, TiO$_2$ and SnO$_2$ respectively and expressed by the general formula:

$$xBaO\text{-}ySiO_2\text{-}z\{ZrO_{2(1-\beta)}TiO_{2(\beta 1)}SnO_{2(\beta 2)}\}$$

(wherein x, y and z are weight percentage of respective components and $x+y+z=100$, $\beta=\beta 1+\beta 2$, $0\leq\beta 1$, $0\leq\beta 2$, and $0.01\leq\beta\leq 0.30$), having compositional proportions falling within the polygonal area defined by the points A, B, C and D in FIG. 1, the sets of x, y and z at said points A, B, C and D being as follows:

| | x | y | z |
|---|---|---|---|
| A | 50 | 49 | 1 |
| B | 50 | 20 | 30 |
| C | 15 | 20 | 65 |
| D | 15 | 84 | 1 | the content of said aluminum oxide being, when calculated in terms of Al$_2$O$_3$, not more than 20 parts by weight per 100 parts by weight of said basic composition.

7. A temperature compensating dielectric ceramic composition consisting essentially of barium oxide, at least one oxide selected from the group consisting of strontium oxide and calcium oxide, silicon oxide, zirconium oxide and at least one oxide selected from the group consisting of titanium oxide and tin oxide, said components, when calculated in terms of BaO, SrO, CaO, SiO$_2$, ZrO$_2$, TiO$_2$ and SnO$_2$ respectively and expressed by the general formula:

$$x\{BaO_{1-\alpha}SrO_{\alpha 1}CaO_{\alpha 2}\}\text{-}ySiO_2\text{-}z\{ZrO_{2(1-\beta)}TiO_{2(\beta 1)}SnO_{2(\beta 2)}\}$$

(wherein x, y and z are weight percentage of respective components and $x+y+z=100$, $\alpha=\alpha 1+\alpha 2$, $0\leq\alpha 1$, $0\leq\alpha 2$, $0<\alpha\leq 0.90$, $\beta=\beta 1+\beta 2$, $0\leq\beta 1$, $0\leq\beta 2$, and $0.01\leq\beta\leq 0.30$), having compositional proportions falling within the polygonal area defined by the points A, B, C and D in FIG. 1, the sets of x, y and z at said points A, B, C and D being as follows:

| | x | y | z |
|---|---|---|---|
| A | 50 | 49 | 1 |
| B | 50 | 20 | 30 |
| C | 15 | 20 | 65 |
| D | 15 | 84 | 1 | the content of said aluminum oxide being, when calculated in terms of Al$_2$O$_3$, not more than 20 parts by weight per 100 parts by weight of said basic composition.

* * * * *